(12) United States Patent
Can et al.

(10) Patent No.: US 11,873,256 B2
(45) Date of Patent: Jan. 16, 2024

(54) POLYCRYSTALLINE DIAMOND WITH IRON-CONTAINING BINDER

(71) Applicant: Element Six (UK) Limited, Oxfordshire (GB)

(72) Inventors: Antionette Can, Oxfordshire (GB); Xiaoxue Zhang, Oxfordshire (GB); Igor Petrusha, Kiev (UA); Alexander Osipov, Kiev (UA); Denis Stratiichuk, Kiev (UA); Vladimir Turkevich, Kiev (UA)

(*) Notice: Subject to any disclaimer, the term of this patent is extended or adjusted under 35 U.S.C. 154(b) by 0 days.

(21) Appl. No.: 17/772,911

(22) PCT Filed: Nov. 26, 2020

(86) PCT No.: PCT/EP2020/083522
§ 371 (c)(1),
(2) Date: Apr. 28, 2022

(87) PCT Pub. No.: WO2021/115795
PCT Pub. Date: Jun. 17, 2021

(65) Prior Publication Data
US 2022/0348506 A1    Nov. 3, 2022

(30) Foreign Application Priority Data

Dec. 13, 2019    (GB) ..................... 1918378

(51) Int. Cl.
*C04B 35/528*    (2006.01)
*B23B 27/14*    (2006.01)
(Continued)

(52) U.S. Cl.
CPC .......... *C04B 35/528* (2013.01); *B23B 27/148* (2013.01); *C04B 35/63436* (2013.01); *C04B 35/645* (2013.01); *C04B 37/001* (2013.01); *B23B 2226/315* (2013.01); *C04B 2235/3852* (2013.01); *C04B 2235/425* (2013.01);
(Continued)

(58) Field of Classification Search
None
See application file for complete search history.

(56) References Cited

U.S. PATENT DOCUMENTS

| 4,505,746 A | 3/1985 | Nakai et al. |
| 5,009,673 A * | 4/1991 | Cho .................... C04B 35/5831 |
| | | 51/293 |

(Continued)

FOREIGN PATENT DOCUMENTS

| CN | 102794447 B | 8/2014 |
| EP | 2930144 A1 | 10/2015 |

(Continued)

OTHER PUBLICATIONS

International Search Report and Written Opinion issued for PCT/EP2020/083522, dated Feb. 4, 2021 (10 pages).
(Continued)

*Primary Examiner* — James A Fiorito
*Assistant Examiner* — Ross J Christie
(74) *Attorney, Agent, or Firm* — Armstrong Teasdale LLP

(57) ABSTRACT

This disclosure relates to a polycrystalline diamond (PCD) body comprising a PCD material formed of intergrown diamond grains forming a diamond network, and an iron-containing binder.

19 Claims, 10 Drawing Sheets

(51) Int. Cl.
*C04B 35/634* (2006.01)
*C04B 35/645* (2006.01)
*C04B 37/00* (2006.01)

(52) U.S. Cl.
CPC .. *C04B 2235/427* (2013.01); *C04B 2235/604* (2013.01); *C04B 2235/6567* (2013.01); *C04B 2235/786* (2013.01); *C04B 2237/363* (2013.01)

(56) References Cited

U.S. PATENT DOCUMENTS

| | | | |
|---|---|---|---|
| 6,068,913 A * | 5/2000 | Cho | C04B 37/025 428/323 |
| 6,651,757 B2 * | 11/2003 | Belnap | C04B 35/486 175/420.2 |
| 2016/0251742 A1 * | 9/2016 | Kanyanta | C22C 26/00 51/307 |
| 2020/0283927 A1 * | 9/2020 | Sumiya | B23B 27/14 |

FOREIGN PATENT DOCUMENTS

| | | | |
|---|---|---|---|
| JP | S5515981 A | 2/1980 | |
| JP | S62271604 A | 11/1987 | |
| JP | S648242 A | 1/1989 | |
| WO | 2017198662 A1 | 11/2017 | |
| WO | WO-2019077844 A1 * | 4/2019 | B01J 3/062 |

OTHER PUBLICATIONS

International Preliminary Report on Patentability issued for PCT/EP2020/083522, dated Nov. 26, 2021 (23 pages).

Combined Search and Examination Report issued for GB1918378.9, dated Jun. 22, 2020 (6 pages).

Combined Search and Examination Report issued for GB2018621.9, dated May 11, 2021 (6 pages).

* cited by examiner

POLYCRYSTALLINE DIAMOND WITH IRON-CONTAINING BINDER

CROSS-REFERENCE TO RELATED APPLICATIONS

This application is the § 371 national stage of International Application No. PCT/EP2020/083522, filed Nov. 26, 2020, which claims priority to Great Britain Application No. 1918378.9, filed Dec. 13, 2019.

FIELD OF THE INVENTION

This disclosure relates to a superhard structure comprising a body of polycrystalline diamond comprising iron containing compounds and to a method of making such a body.

BACKGROUND ART

Polycrystalline super-hard materials, such as polycrystalline diamond (PCD) and polycrystalline cubic boron nitride (PCBN) may be used in a wide variety of tools for cutting, machining, drilling or degrading hard or abrasive materials such as rock, metal, ceramics, composites and wood-containing materials.

Abrasive compacts are used extensively in cutting, turning, milling, grinding, drilling and other abrasive operations. They generally contain ultrahard abrasive particles dispersed in a second phase matrix. The matrix may be metallic or ceramic or a cermet. The ultrahard abrasive particles may be diamond, cubic boron nitride (cBN), silicon carbide or silicon nitride and the like. These particles may be bonded to each other during the high pressure and high temperature compact manufacturing process generally used, forming a polycrystalline mass, or may be bonded via the matrix of second phase material(s) to form a sintered polycrystalline body. Such bodies are generally known as polycrystalline diamond or polycrystalline cubic boron nitride, where they contain diamond or cBN as the ultra-hard abrasive, respectively.

Sintered polycrystalline bodies may be 'backed' by forming them on a substrate. Cemented tungsten carbide, which may be used to form a suitable substrate, is formed from carbide particles dispersed, for example, in a cobalt matrix by mixing tungsten carbide particles/grains and cobalt together then heating to solidify. To form the cutting element with an ultra-hard material layer such as PCD or PCBN, diamond particles or grains or CBN grains are placed adjacent the cemented tungsten carbide body in a refractory metal enclosure such as a niobium enclosure and are subjected to high pressure and high temperature so that intergrain bonding between the diamond grains or CBN grains occurs, forming a polycrystalline super hard diamond or polycrystalline CBN layer.

Both tungsten (W) and cobalt (Co) have been classed in Europe as a Critical Raw Material (CRM). CRMs are raw materials deemed economically and strategically important for the European economy. In principal, they have a high-risk associated with their supply, have a significant importance for key sectors in the European economy such as consumer electronics, environmental technologies, automotive, aerospace, defence, health and steel, and they have a lack of (viable) substitutes. Both tungsten and cobalt are main constituents for two important classes of hard materials, cemented carbides/WC-Co, and PCD/diamond-Co.

It is an object of this invention to develop viable alternative materials, for rock removal applications and also for machining operations, that perform well under extreme conditions.

SUMMARY OF THE INVENTION

In a first aspect of the invention, there is provided a polycrystalline diamond (PCD) body comprising a PCD material formed of intergrown diamond grains forming a diamond network, and an iron-containing binder.

Optional and/or preferable features of the first aspect of the invention are provided in dependent claims 2 to 12.

In a second aspect of the invention, there is provided a method of producing a polycrystalline diamond (PCD) body, comprising the steps:
a. Forming a precursor binder mixture of $Fe_xN$ and graphite powders;
b. Adding the precursor binder mixture to a refractory cup;
c. Adding a diamond feed stock to the cup, adjacent to the precursor binder mixture;
d. Compacting the precursor binder mixture and diamond feed stock in the cup to form a green body;
e. Sintering the green body at a temperature of 1700° C. to 2300° C. and at a pressure of at least 7 GPa, for at least 30 seconds to form a sintered PCD body.

The $Fe_xN$ and graphite are used as a catalyst for diamond growth and successfully replace traditionally used cobalt. They can even be used to reduce the amount of cobalt required in a backed diamond body, such that $Fe_xN$, graphite and cobalt act synchronously together as catalysts for diamond growth.

Optional and/or preferable features of the second aspect of the invention are provided in dependent claims 16 to 30.

BRIEF DESCRIPTION OF THE DRAWINGS

Non-limiting embodiments will now be described by way of example and with reference to the accompanying drawings in which.

DETAILED DESCRIPTION

Figure 1:
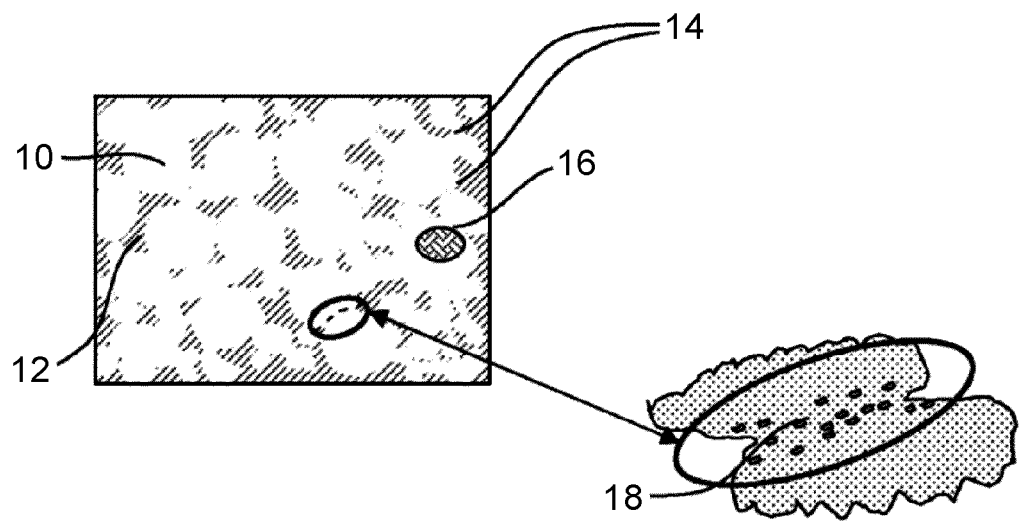
FIG. 1 is a schematic diagram of the microstructure of PCD material showing the intergrown network of diamond grains with an inter-penetrating metallic network with facets occurring at the diamond-metal interfaces.

Polycrystalline diamond materials (PCD), as considered in this disclosure, consists of an intergrown network of diamond grains with an interpenetrating metallic network. This is illustrated schematically in FIG. 1, which shows the microstructure of known PCD material comprising the intergrown network of diamond grains 10 with an inter-penetrating metallic network 12 with facets occurring at the diamond-metal interfaces 14. Each grain has a degree of plastic deformation 16.

Newly crystallized diamond bonds 18 bond the diamond grains as shown in the inset of this figure. The network of diamond grains is formed by sintering of diamond powders facilitated by molten metal catalyst/solvent for carbon at elevated pressures and temperatures. The diamond powders may have a monomodal size distribution whereby there is a single maximum in the particle number or mass size distribution, which leads to a monomodal grain size distribution in the diamond network. Alternatively, the diamond powders may have a multimodal size distribution where there are two or more maxima in the particle number or mass size distribution, which leads to a multimodal grain size distribution in the diamond network. Typical pressures used in this process are in the range of around 4 to 7 GPa but higher pressures up to 10 GPa or more are also practically accessible and can be used. The temperatures employed are above the melting point at such pressures of the metals. The metallic network is the result of the molten metal freezing on return to normal room conditions and will inevitably be a high carbon content alloy. In principle, any molten metal solvent for carbon which can enable diamond crystallization at such conditions may be employed. The transition metals of the periodic table and their alloys may be included in such metals.

Conventionally, the predominant custom and practice in the prior art is to use the binder metal of hard metal substrates caused to infiltrate into a mass of diamond powder, after melting of such binders at the elevated temperature and pressure. This is infiltration of molten metal at the macroscopic scale of the conventional PCD construction, i.e., infiltrating at the scale of millimetres. By far the most common situation in the prior art is the use of tungsten carbide, with cobalt metal binders as the hard metal substrate. This inevitably results in the hard metal substrate being bonded in-situ to the resultant PCD. Successful commercial exploitation of PCD materials to date has been very heavily dominated by such custom and practice.

Figure 2:
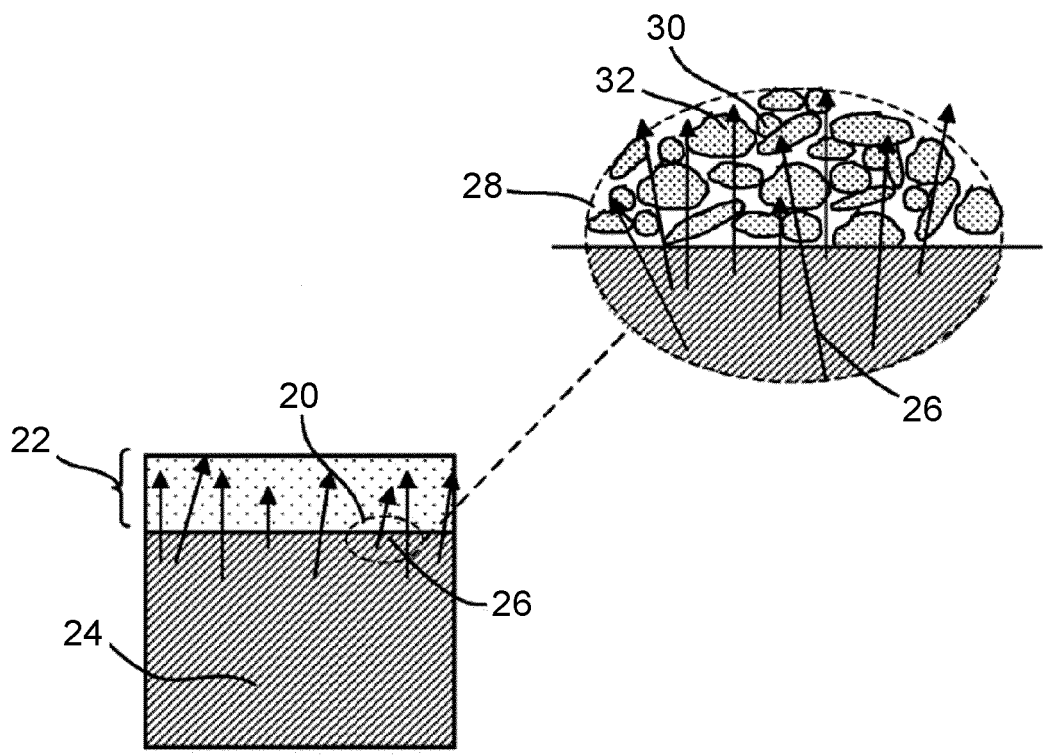
FIG. 2 is a schematic diagram of the infiltration process in a conventional backed PCD body with arrows indicating the direction and the long range of the infiltration through 2 to 3 mm of the PCD layer.

PCD constructs which use hard metal substrates as a source of the molten metal sintering agent via directional infiltration and the bonding in-situ to that substrate, are known. This is illustrated in FIG. 2, which is a schematic diagram of the infiltration process in a conventional PCD body with arrows indicating the direction and the long range of the infiltration through 2 to 3 mm of thickness of the PCD layer. The arrows in the inset 20 indicate again that the range of infiltration transcends many diamond grains. The PCD layer 22 in a conventional PCD body is normally of the order of 2 to 3 mm in thickness. The substrate 24 is predominantly made of tungsten carbide/cobalt alloy. The number 26 indicates approximately the direction of the infiltration of the cobalt infiltrant through the thickness of the PCD layer during the high-pressure high-temperature process. The oval region 28 is at the interface between the carbide substrate and the PCD layer, and the inset of FIG. 2 shows schematically an expanded view of region 28 with the diamond grains in this region through which the long-range infiltration of cobalt occurs. The inset highlights the fact that the directional infiltration transcends many grains through the thickness of the PCD layer. The diamond grains 30 and 32 may typically be of varying size in the body and could be made of multi modal mixes of diamond particles.

In an unbacked embodiment of the invention, traditional cobalt, Co, metal binder is replaced pre-sintering with a $Fe_xN$ and graphite mixture 34. In an alternative backed embodiment of the invention, traditional cobalt, Co, metal binder infiltrates into the binder and influences the sintering and final microstructure. Further details are provided below.

Method

Figure 3:
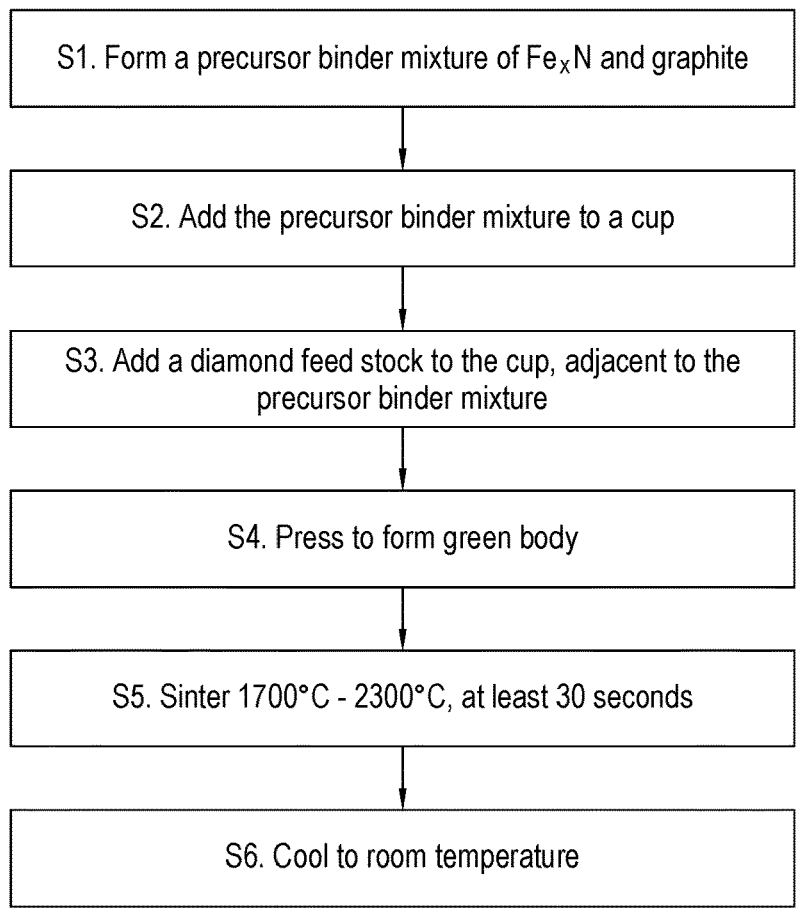
FIG. 3 is a schematic flow diagram showing an embodiment of the method.

FIG. 3 is a flow diagram showing exemplary method steps, in which the following numbering corresponds to that of FIG. 3.

S1. Precursor powders of $Fe_xN$ and graphite are mixed together to form a precursor binder mixture 34.

S2. The precursor binder mixture 34 is added to a cup 36 made from refractory material such as niobium, tantalum or molybdenum.

S3. A diamond feed stock 38 is then added to the cup. The diamond feed stock 38 is placed on top of the precursor binder mixture 34, which is at the bottom of the cup 36.

Optionally, a second layer of precursor binder mixture 34 may be added to the cup 36, on top of the diamond feed stock 38. Thus, a precursor binder mixture 34 and diamond feed stock 38 sandwich is made, with a first and second layer of precursor binder mixture 34 either side of the intermediate diamond feed stock 38.

The precursor binder mixture/diamond 34 ratio may be between 5 and 30 wt. %. Preferably, the precursor binder mixture/diamond 34 ratio may be between 5 and 20 wt. %. More preferably, the precursor binder mixture/diamond 34 ratio may be between 5 and 15 wt. %. Optionally, the precursor binder mixture/diamond 34 ratio is set at 7.5 wt. %, 10 wt. % or 12.5 wt. %.

S3a. Optionally, a carbide substrate may be added to the cup 36.

In the case where there is a single layer of precursor binder mixture 34, the carbide substrate is placed adjacent the diamond feed stock 38. The layering system is as follows: precursor binder mixture 34—diamond feed stock 38—carbide substrate.

In the case where there are two layers, i.e. first and second layers of precursor binder mixture 34, the carbide substrate is preferably placed adjacent the second layer of precursor binder mixture 34 such that the first and second layers of precursor binder mixture 34 sandwich the diamond feed stock 38 in the middle, and the carbide substrate is adjacent the second layer of precursor binder mixture 34. The layering system is as follows: first layer of precursor binder mixture 34—diamond feed stock 38—second layer of precursor binder mixture 34—carbide substrate.

Having two layers of precursor binder mixture 34 is preferable when the resulting article is to be unbacked, i.e. with no carbide substrate.

S4. The precursor binder mixture 34 and diamond feed stock 38 are then compressed within the cup 36, typically by hand, to form a green body.

S5. The dry pressed green body is then sintered in a HPHT capsule within a HPHT belt press or HPHT cubic press, at a temperature of at least 1700° C. at a pressure of about 7 GPa for a period of at least 30 seconds.

S6. After sintering, the resultant sintered articles cools to room temperature before being removed from the HPHT press. The cooling rate is uncontrolled.

Example 1

S1. Iron nitride ($Fe_{2-4}N$) powder with size 325 mesh (Alfa Aesar™ GmbH & Co KG) was added to graphite powder, GSM-1 with size 160 mkm, which is a special natural low-ash graphite (code GOST 17022-81 from Zavalevsk mine in Ukraine). According to X-ray data, the $Fe_xN$ was $Fe_4N$ (53%)+$Fe_3N$ in approximately equal amounts. 25 g of $Fe_xN$ was added to 11.6 g of graphite, resulting in approximately 50 vol. % graphite in mixture with $Fe_xN$.

The $Fe_xN$ and graphite powders were mixed together using laboratory Planetary Mono Mill PULVERISETTE 6™. Silicon nitride grinding cup (250 ml) and 50 pieces silicon nitride balls of 10 mm diameter.

The mixing process is detailed as follows:
Add 36.6 g of $Fe_xN$ and graphite mixture to the planetary mixer;
Dry mix at 250 rpm for 30 minutes; and
After mixing, remove the silicon nitride balls using a 1 mm sieve.

0.42 g of $Fe_xN$ and graphite mixture was then compacted using a steel mold to fabricate a disk of 8 mm in diameter. The applied load was 1.15 metric tons (the compacting pressure was 2.3 metric tons/cm$^2$). After compaction, the thickness of the disk was approximately 2.5 mm.

S2. The $Fe_xN$/graphite disc was placed into a cup made from molybdenum.

S3. The diamond feed stock included two sources of diamond:
Particle size range 17.1-18.9 μm, amount 15 g
Particle size range 3.05-3.37 μm, amount 5 g
Powders were dry mixed in a 150 ml polytetrafluoroethylene (PTFE) pot using 3 mm diameter $ZrO_2$ balls (constituting 50 ml filling of the mixing pot) for 10 min at 60 rpm. After mixing, the $ZrO_2$ balls were removed using a 1 mm sieve. The resulting mixture was then dried in an oven at a temperature of 150° C. for 2 hours and stored in a closed container.

A mixture of diamond powders, as described above, was then added to the cup containing the $Fe_xN$/graphite disc. More specifically, around 1.35 to 1.40 g of diamond powders was taken and slightly compacted before being placed adjacent to the $Fe_xN$/graphite disc in the cup.

Figure 4:
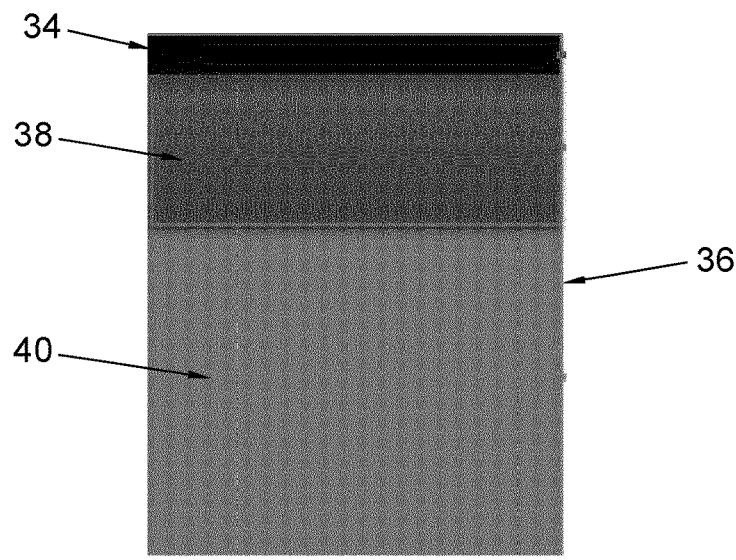
FIG. 4 is a schematic diagram of a green body (i.e. pre-sintering) in one embodiment.
Figure 5:
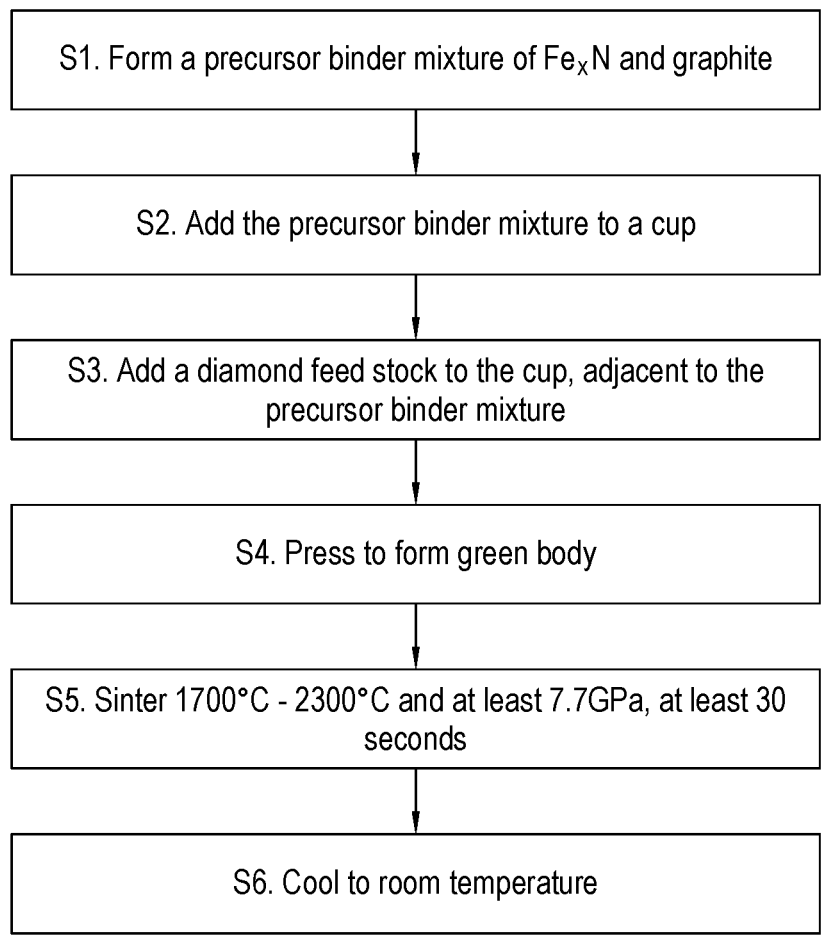
FIG. 5 is a schematic flow diagram showing a further embodiment of the method.

S3a. As shown in FIGS. 4 and 5, optionally, a carbide backing 40 is inserted into the cup adjacent to the diamond feed to facilitate a backed PCD body. This was not done for sample Example 1 but it was included with other samples, like Example 2—more details below. S4. The $Fe_xN$/graphite disc and the diamond grains in the cup were compacted by hand to form a green body. The final thickness of the green body in the cup was approximately 4.6 mm.

S5. The cup containing the green body was then placed into a HPHT capsule and subsequently into a HPHT press. The pressure was ramped up to 7.7 GPa in a period of 1 minute. The temperature was varied as follows:
30 seconds—a steady increase in temperature to around 2200-2300° C.; (rise of electric current power in graphite heater in the HPHT press to 5.8 kW)
90 seconds—hold at this temperature range;
10 seconds—steady decreasing of heat (electric power to zero) for 10 seconds.

Sintering enabled filtration of the $Fe_xN$/graphite from the disc into the diamond, in a similar way to that described earlier with respect to cobalt.

S6. The sintered compact was then removed from the HPHT press and left to cool to room temperature.

Figure 6:
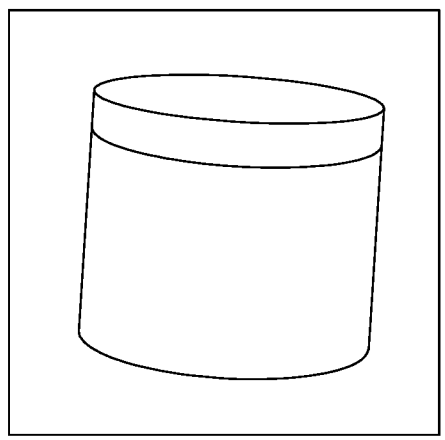
FIG. 6 is an image of a sintered backed PCD body.

FIG. 6 shows an example sintered backed PCD body which has been post-treated (e.g. sand-blasting) to achieve the final outer diameter.

Figure 7:
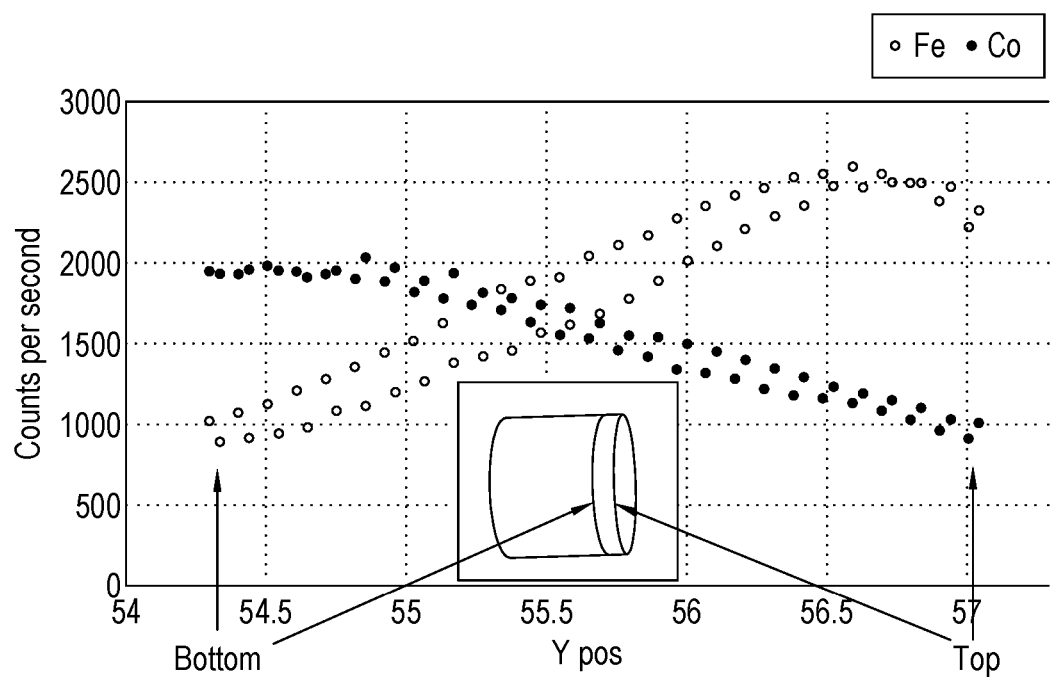
FIG. 7 is a graph indicating the infiltration of Co and Fe through the PCD table.

FIG. 7 shows an example infiltration profile of iron and cobalt through the PCD and the extent to which they travel from bottom to top of the sintered PCD body, and vice versa.

Scope of Further Samples

In other samples, the following variables were investigated:
Two different diamond feed stocks, X and Y.
Mono-modal diamond powder X had an average particle size of around 30 μm.
Bi-modal diamond powder Y comprised 15 wt. % of diamond powder with an average particle size of 2 μm and 85 wt. % of diamond powder with an average particle size of 22 μm.
Binder to diamond content, 7.5 wt. %, 10.0 wt. %, 12.5 wt. %;
PCD table thickness, 2 to 3.5 mm;
Backed and unbacked samples, i.e. with and without a tungsten carbide substrate containing cobalt;
For backed samples, the cobalt content in substrate, 8.5%, 10% and 13%; and
Two further sintering temperatures, 1800° C. and 1900° C.

Due to subsequent difficulties in brazing the sintered compact into rock machining application tooling, additional runs to sinter the diamond onto a carbide backing (more details follow) were completed. Backed samples were sintered around 1800° C.

Cracking was experienced in the thicker PCD tables (thickness=3 mm) and so the PCD thickness was reduced for subsequent testing.

Early investigations found that the best starting combination was a backed PCD body having a 2 mm PCD table thickness, 13 wt. % Co containing substrate, 10 wt. % FeRN+C (in the form of graphite) binder, which was sintered between 1800° C. and 1900° C.

Example 2

Example 2 is a backed PCD body, with a binder to diamond content of 10 wt. %. It was made in a similar way to Example 1 but with lower sintering temperatures, between 1800° C. and 1900° C.

Application Pre-Screening Testing

The variants in Tables 1 and 2 below were selected for pre-screening tests.

TABLE 1

| Unbacked Fe$_x$N PCD | Higher (12.5 wt. %) binder | Lower (10 wt. %) binder |
|---|---|---|
| Bi-modal diamond powder Y | F35, F36 | F20, F21 |

TABLE 2

| Backed Fe$_x$N PCD | Higher (12.5 wt. %) binder | Lower (10 wt. %) binder |
|---|---|---|
| Bi-modal diamond powder Y | | Example 2 (an edge chip), F34 (rough centre) |

Figure 8:
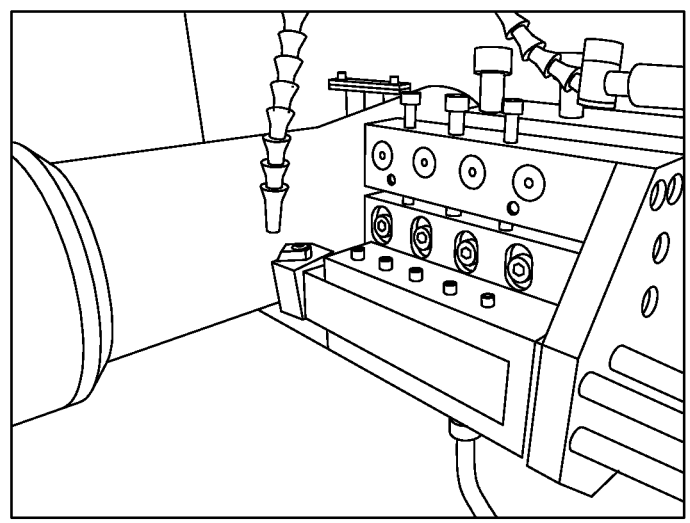
FIG. 8 is an image of a standard manual lathe with a block of red granite for use in the performance testing.

A pre-screening test was carried out with the machining of red granite using the selected PCD variants under the following cutting conditions: surface cutting speed $v_c$=100 m/min, feed rate f=0.2 mm/rev, depth of cut $a_p$=0.25 mm and WET machining conditions using tap water. A standard manual lathe was used, as shown in FIG. 8.

Forces were measured using a Kistler™ 9129AA piezoelectric dynamometer.

Flank wear was measured using an optical microscope, Olympus™ SZX7.

Figure 9:
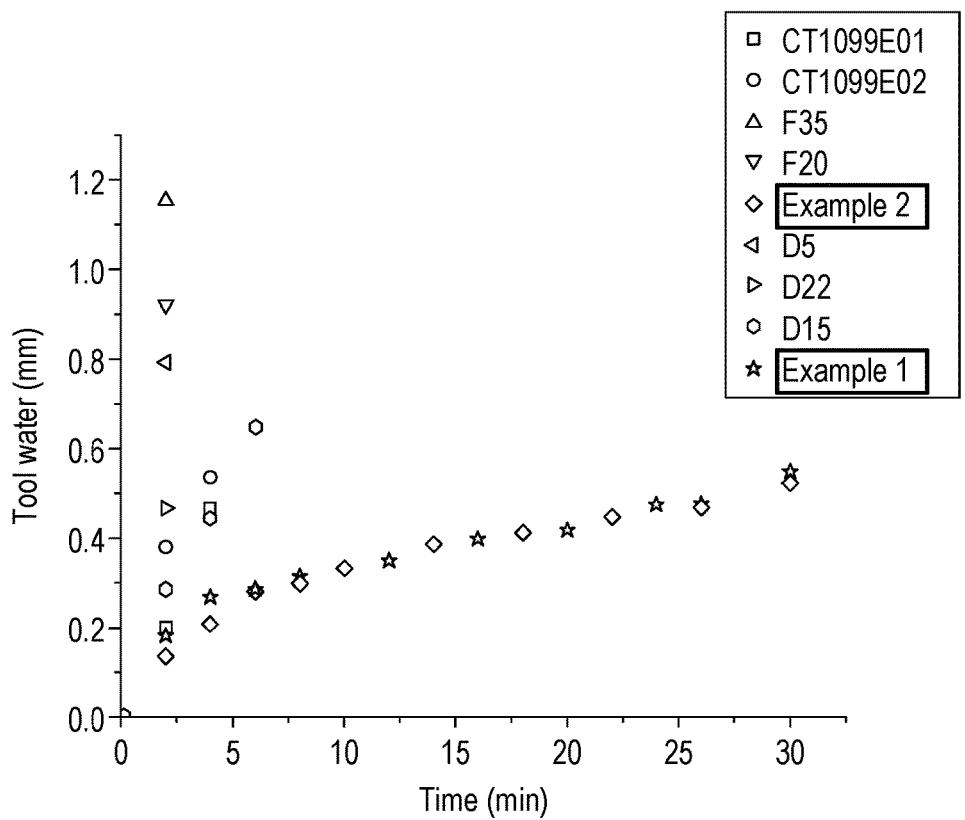
FIG. 9 is a graph plotting tool wear (mm) over time for various samples.
Figure 10:
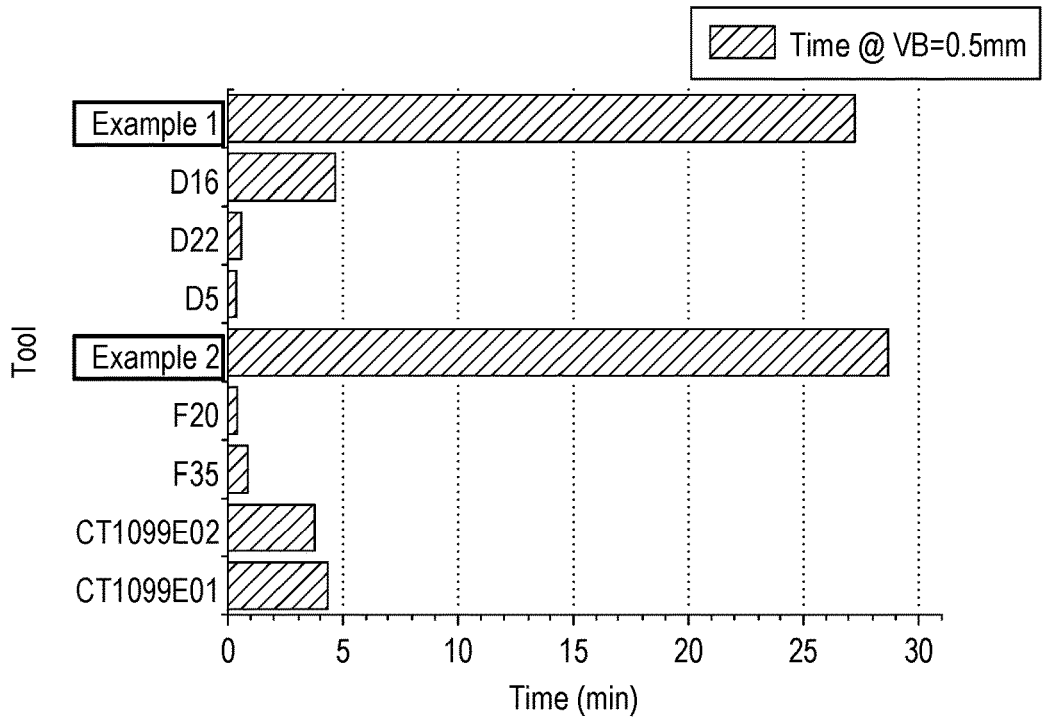
FIG. 10 is a bar chart showing VB wear test, indicating the time tor each a wear scar VB=0.5 mm.
Figure 11:
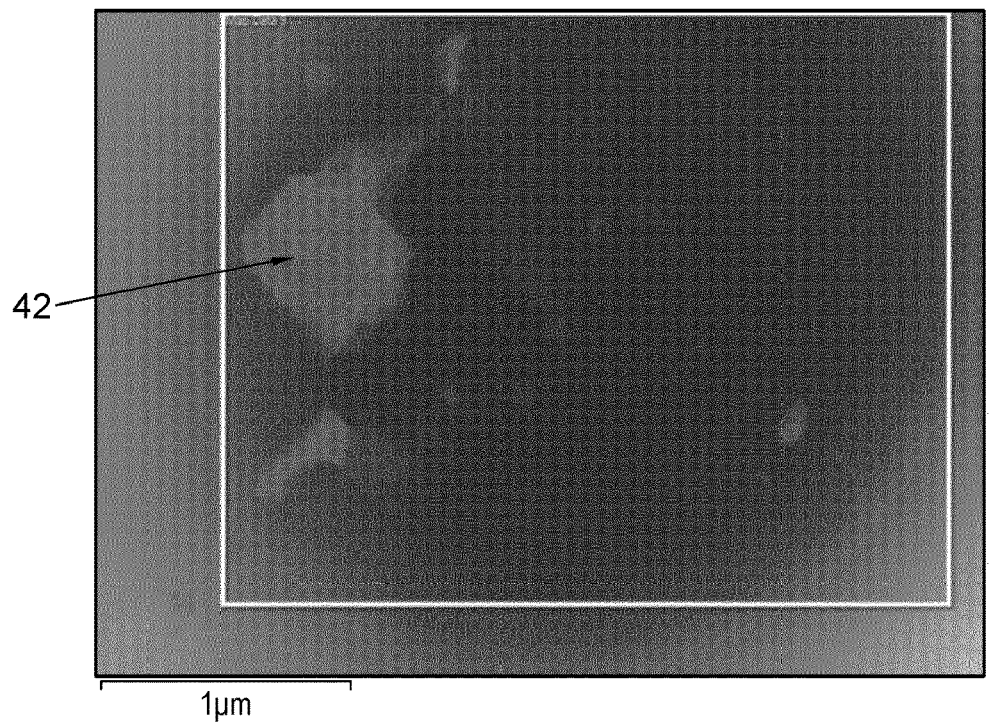
FIG. 11 is a Scanning Electron Microscopy (SEM) micrograph of a first precipitate.
Figure 12:
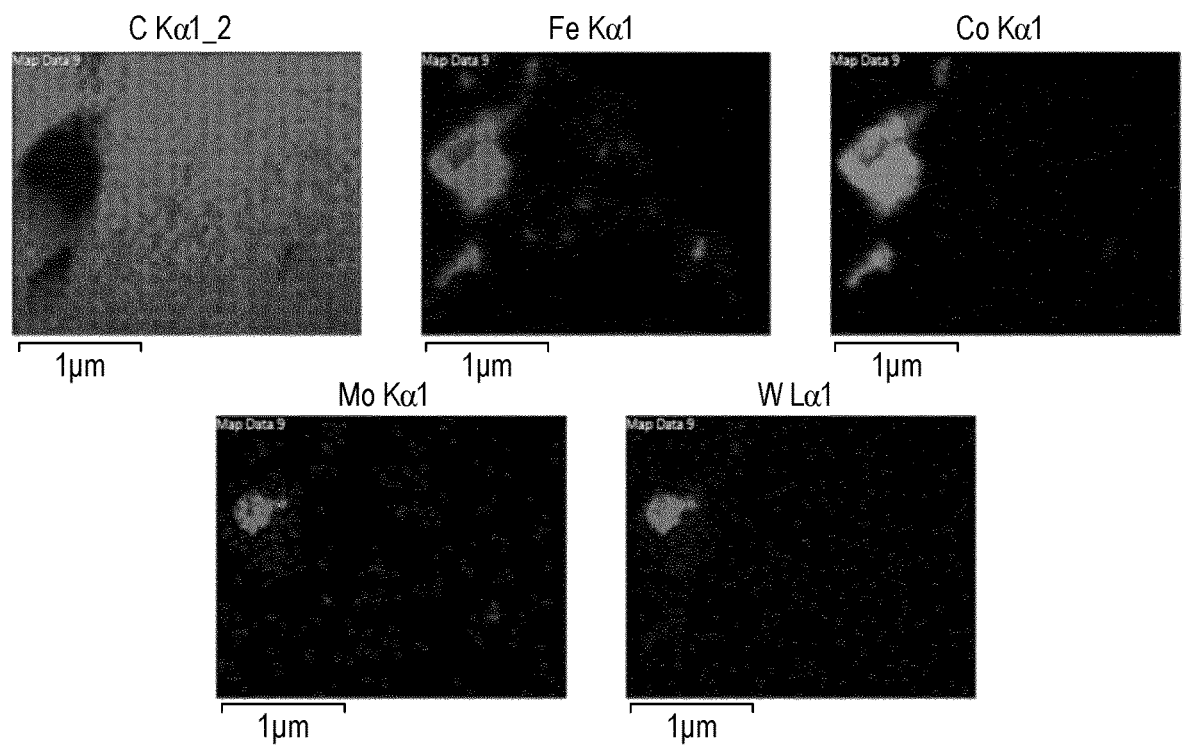
FIG. 12 are Energy Dispersive X-ray Spectroscopy (EDS) images of the precipitate of FIG. 11.
Figure 13:
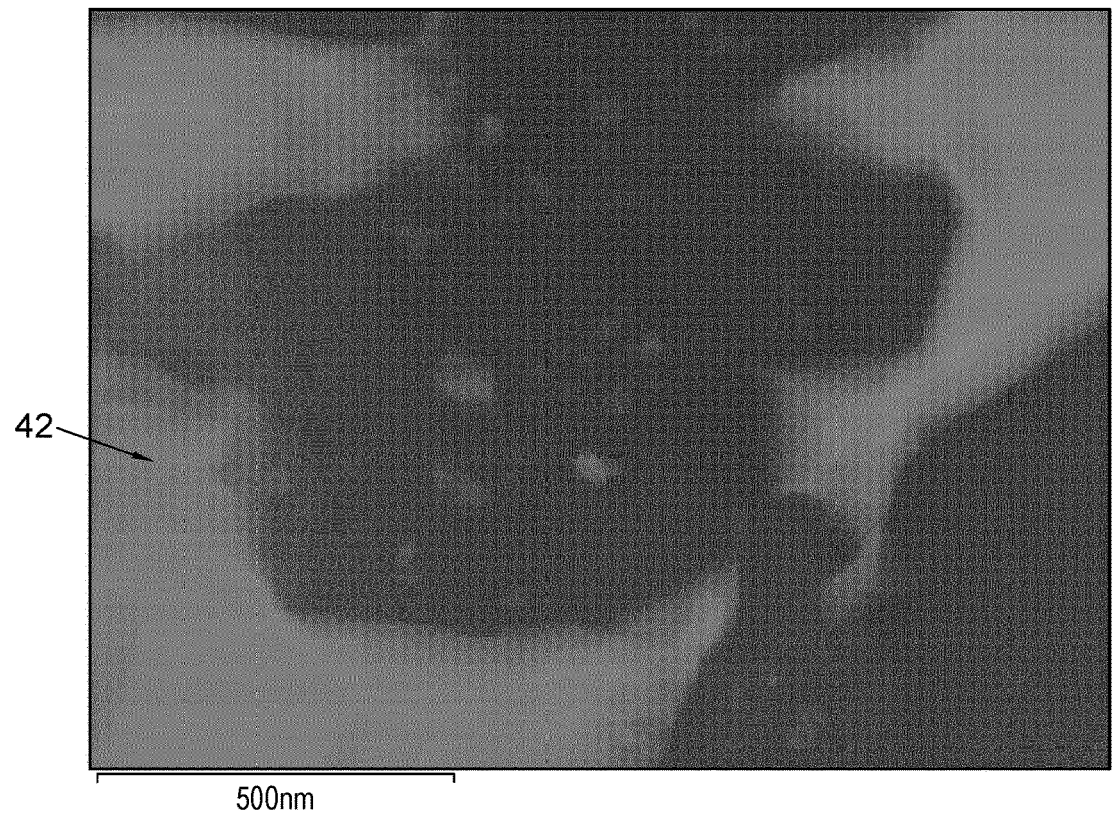
FIG. 13 is an SEM micrograph of a second precipitate.
Figure 14:
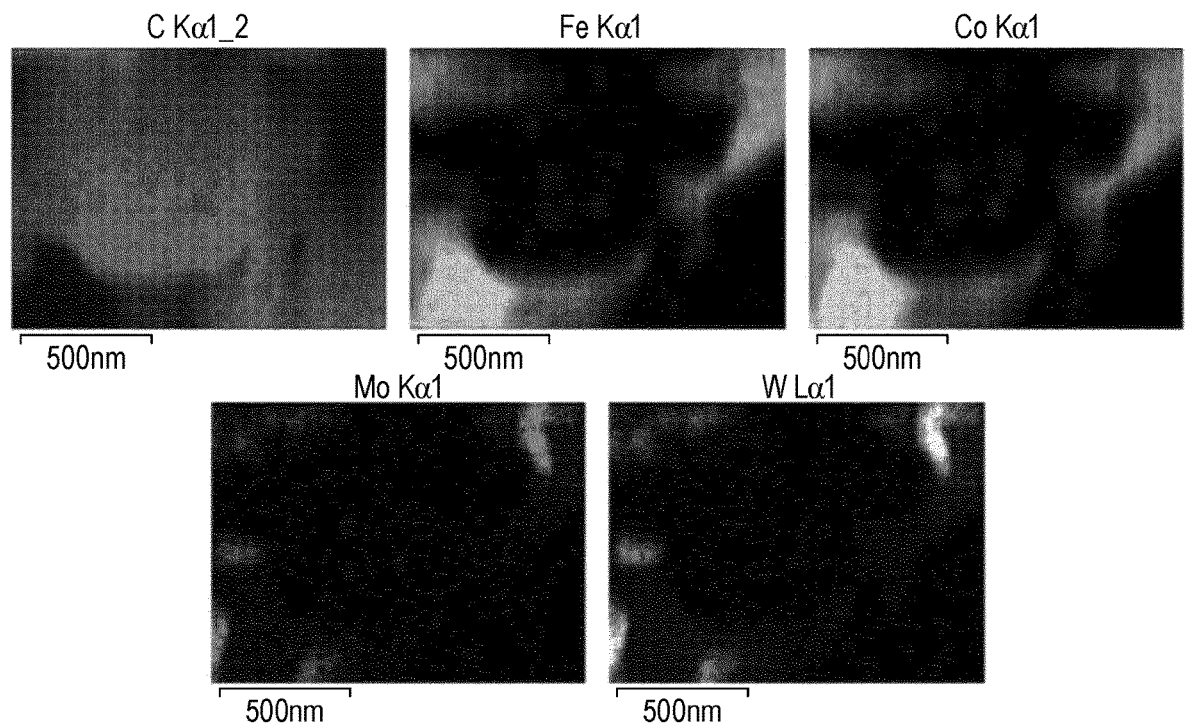
FIG. 14 are EDS images of the precipitate of FIG. 13.
Figure 15:
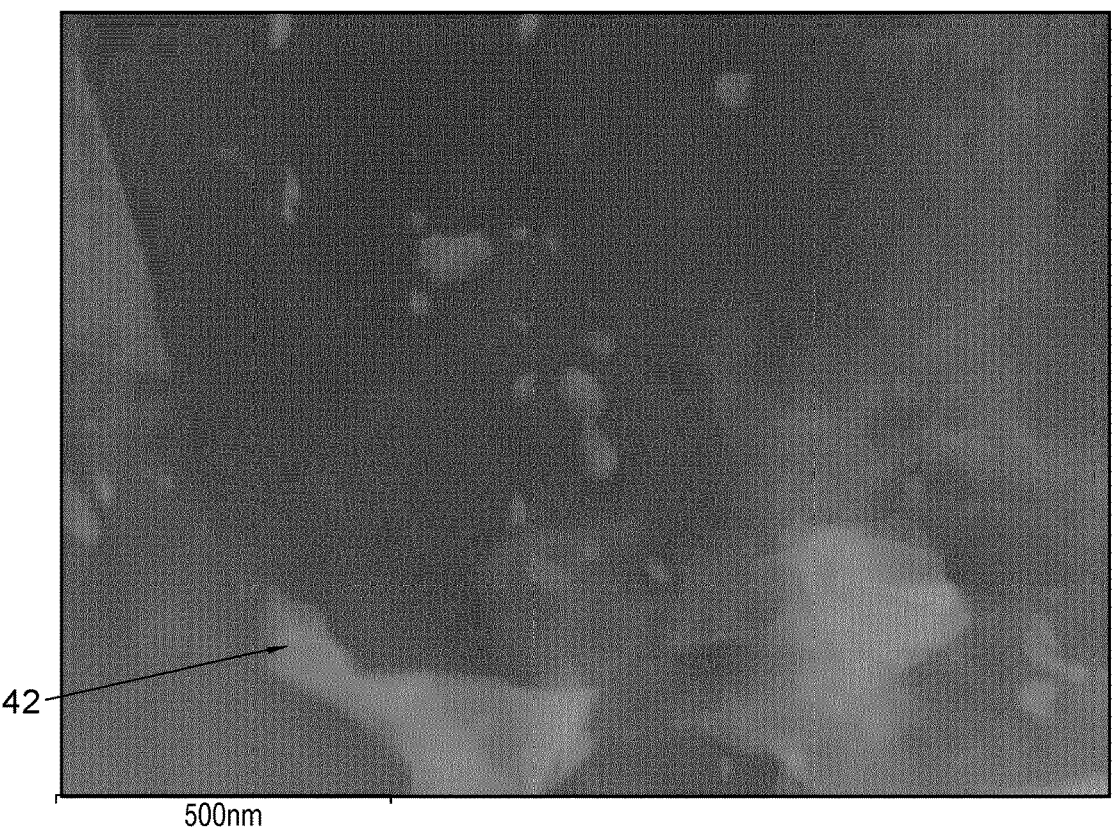
FIG. 15 is an SEM micrograph of a third precipitate.
Figure 16:
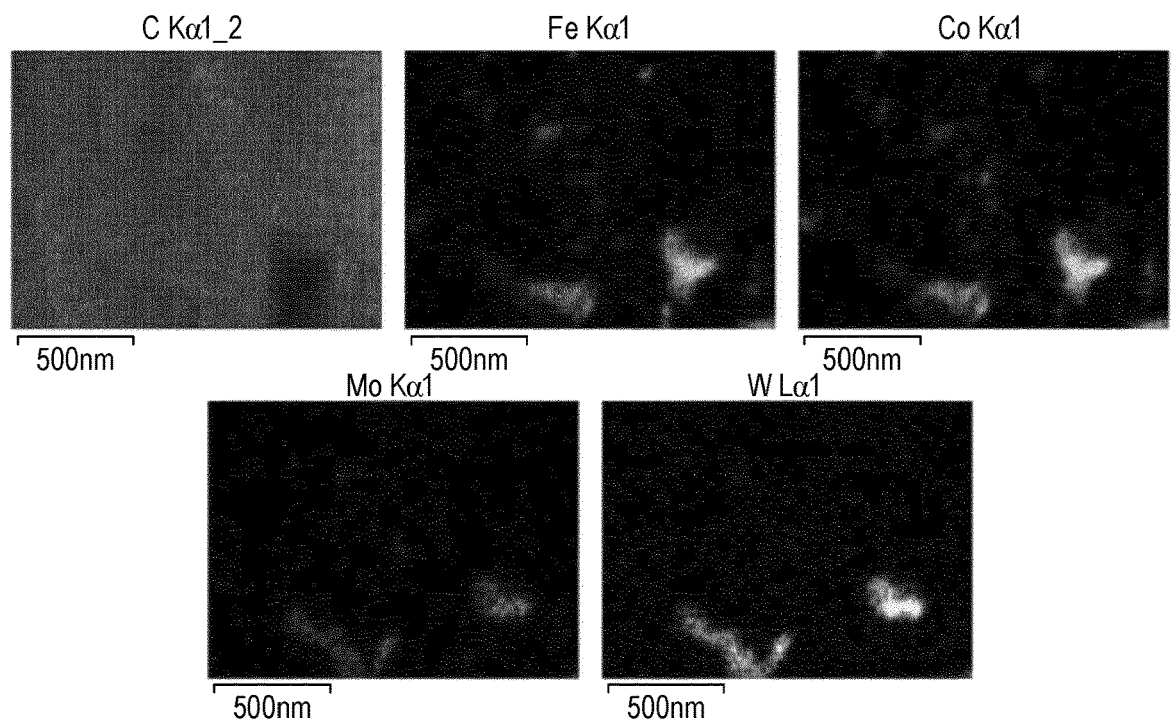
FIG. 16 are EDS images of the precipitate of FIG. 15.

The tool wear (in millimetres) over time is shown in FIG. 9. In FIG. 10, the time taken to reach VB wear @ 0.5 mm for each tool is shown.

Example 2 was identified as the best performing PCD variant, with Example 1 close behind. Example 2 showed significant performance increase (70%) over the reference CT1099E01 and CT1099E02.

For information, reference samples CT1099E01 and CT1099E02 are previously tested PCD grades that outperformed traditional carbide materials in selected rock cutting applications.

Micro-Structural Analysis

The microstructure of the most successful variants was inspected.

A closer inspection of the microstructure revealed the presence of certain precipitates 42 in the intergrown network of diamond grains. Evidence of precipitates was found, best seen in FIGS. 11 and 12, 12 and 14, and 15 and 16. Such precipitates were examined using EDS and found to contain Mo, W and C. Predominantly they included Fe$_x$N precipitates, where x=2, 3 etc. Combined Secondary Electron and Transmission Modes on the SEM confirmed that the precipitates were inside the diamond grain structure, and not on top of the diamond grain structure.

The Mo is believed to have infiltrated from the refractive cup used during HPHT sintering.

Figure 17:
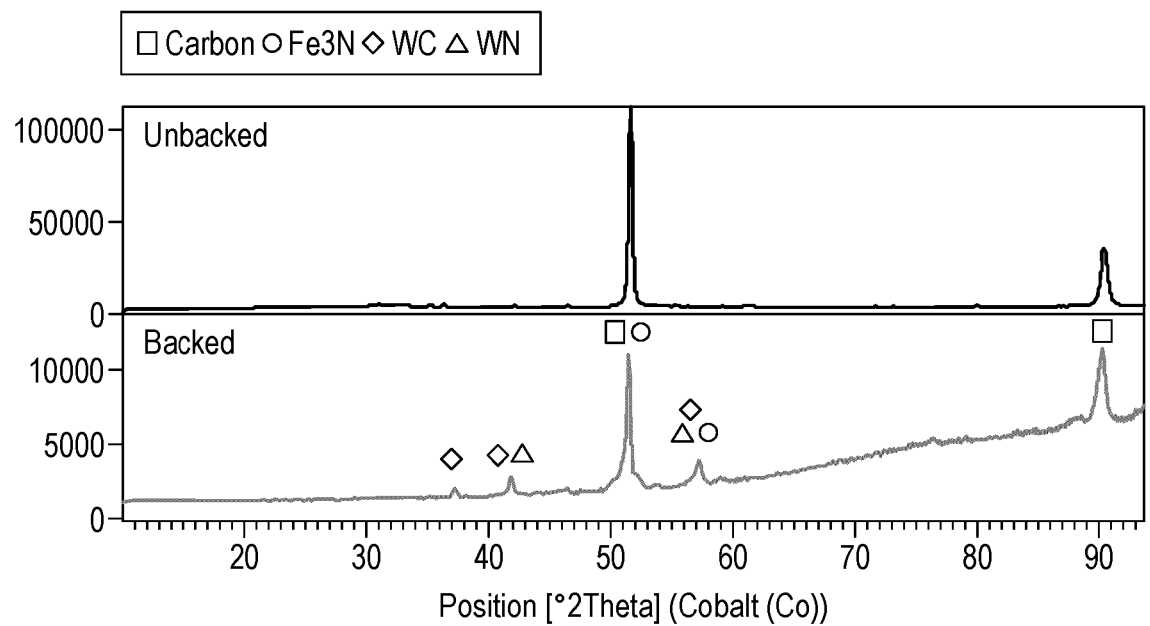
FIG. 17 is an X-ray Powder Diffraction (XRD) pattern of backed and unbacked samples.

FIG. 17 confirms the phases present in backed and unbacked samples.

Figure 18:
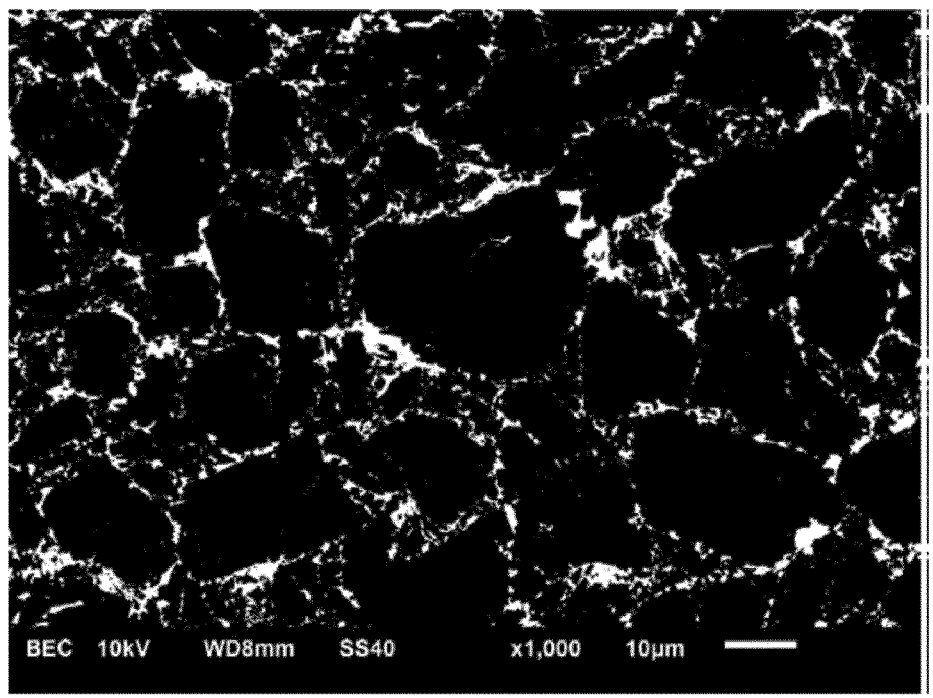
FIG. 18 is an SEM micrograph of a backed sample with 10.0 wt. % binder, with bi-modal diamond powder Y diamond feed, with a 2 mm PCD table, sintered at 1800° C.

In the backed samples, for example as shown in FIG. 18, the binder pools additionally included Fe and Co.

Figure 19:
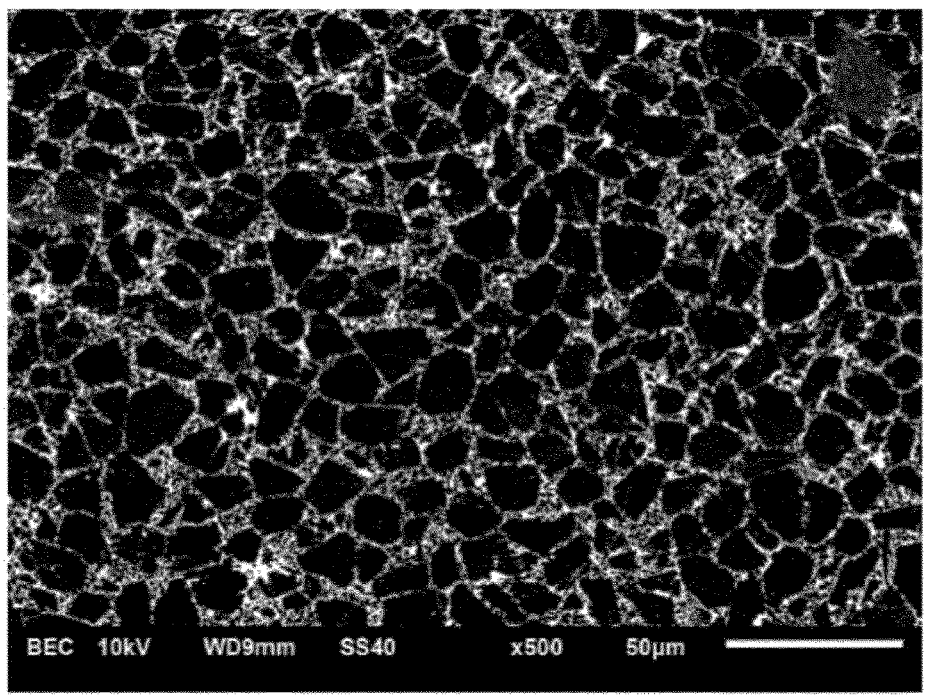
FIG. 19 is an SEM micrograph of an unbacked sample with 10.0 wt. % binder, with mono-modal diamond powder X diamond feed, sintered at 1900° C., at magnification 500×.
Figure 20:
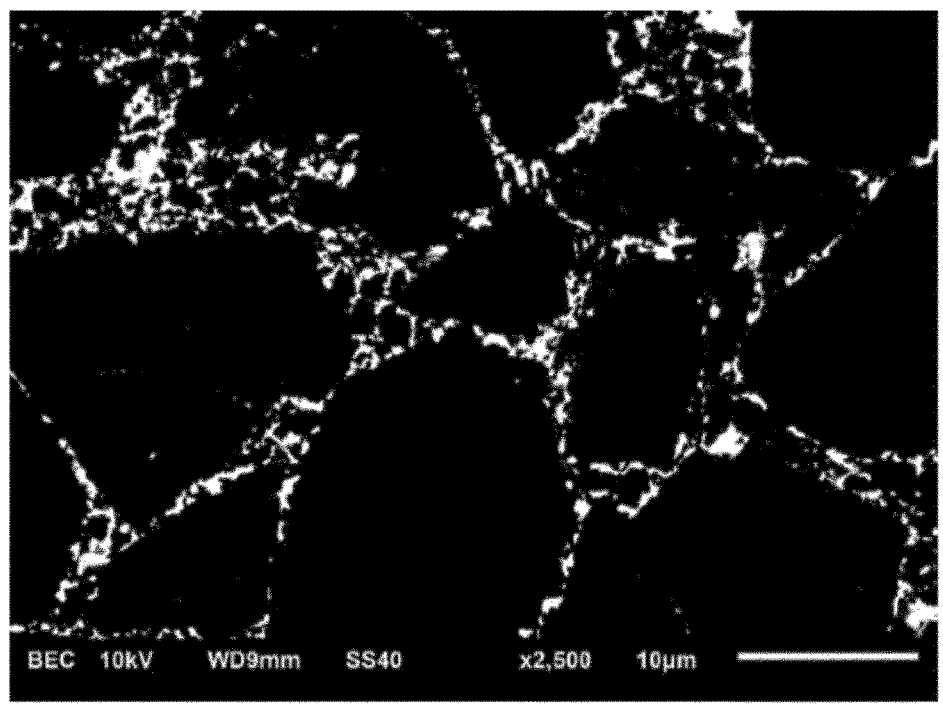
FIG. 20 is the SEM micrograph of FIG. 19, at magnification 2,500×.

In the unbacked samples, for example as shown in FIGS. 19 and 20, evidence of C, Fe, O and N was found.

Precipitates have the shape of any one or more of the following: platelet-like, needle-like and spherical. The largest linear dimension of the precipitates was no more than 1 µm, and usually less than 500 nm, as measured by scanning electron microscopy (SEM). The mean largest linear dimension of the precipitates was around 100 nm.

It is believed that it is these precipitates contribute to wear performance that is comparable to the reference variants.

CONCLUSION

In summary, the inventors have successfully identified several materials which are suitable for use in extreme tooling applications and are viable alternatives to CRMs. In particular, the PCD material with Fe$_x$N binder performs as well as conventional Co-PCD reference grade, and would therefore make a respectable substitute in order to reduce usage of Co.

The PCD material has utility in rock removal applications such as cutting, grinding, machining, percussive rock breaking. Equally, the PCD material shows promise in machining metallic, metal matrix composites (MMC), ceramic matrix composites (CMC) and ceramic materials Machining is considered to include turning, milling and drilling.

While this invention has been particularly shown and described with reference to embodiments, it will be understood by those skilled in the art that various changes in form and detail may be made without departing from the scope of the invention as defined by the appended claims.

The invention claimed is:

1. A method of producing a polycrystalline diamond (PCD) body, comprising the steps:
    a. Forming a precursor binder mixture of FexN and graphite powders;
    b. Adding the precursor binder mixture to a refractory cup in a layer;
    c. Adding a diamond feed stock to the cup, adjacent to the precursor binder mixture;
    d. Compacting the precursor binder mixture and diamond feed stock in the cup to form a green body;
    e. Sintering the green body at a temperature of 1700° C. to 2300° C. and at a pressure of about 7 GPa, or higher for at least 30 seconds to form a sintered PCD body.

2. A method as claimed in claim 1, wherein the PCD body comprises a PCD material formed of intergrown diamond grains forming a diamond network, and an iron-containing binder.

3. A method as claimed in claim 1, wherein the green body is sintered at a temperature in the range of 1800° C. to 1900° C.

4. A method as claimed in claim 1, wherein the green body is sintered at a temperature in the range of 2200° C. to 2300° C.

5. A method as claimed in claim 1, further comprising the step of adding a second said layer of precursor binder mixture before sintering.

6. A method as claimed in claim 1, further comprising the step of adding a carbide substrate to the cup before sintering.

7. A method as claimed in claim 6 further comprising the step of adding a second said layer of precursor binder mixture before sintering, wherein the diamond feed stock is intermediate the first said layer of precursor binder mixture and the second said layer of precursor binder mixture and the carbide substrate is adjacent to the second layer of precursor binder mixture spaced apart from the diamond feed stock.

8. A method as claim in claim 6, wherein the substrate contains around 8.5 wt. %, 10 wt. % or 13 wt. % cobalt.

9. A method as claimed in claim 1, wherein the proportion of the precursor binder mixture to the diamond feed stock is between 5 and 30 wt. %.

10. A method as claimed in claim 9, wherein the proportion of the precursor binder mixture to the diamond feed stock is 7.5 wt. %, 10.0 wt. %, or 12.5 wt. %.

11. A method as claimed in claim 1, wherein the proportion of Fe$_x$N to graphite in the precursor binder mixture is 40 to 60 vol. %.

12. A method as claimed in claim 11, wherein the proportion of $Fe_xN$ to graphite in the precursor binder mixture is around 50 vol. %.

13. A method as claimed in claim 1, wherein the diamond feed stock is bi-modal.

14. A method as claimed in claim 1, wherein the diamond feed stock is mono-modal.

15. A method as claimed in claim 1, wherein the diamond feed stock includes a diamond source with a grain size of 17 to 19 μm.

16. A method as claimed in claim 1 wherein the diamond feed stock includes a diamond source with a grain size of 3 to 4 μm.

17. A method as claimed in claim 1, wherein the proportion of the precursor binder mixture to the diamond feed stock is between 5 and 25 wt. %.

18. A method as claimed in claim 1, wherein the proportion of the precursor binder mixture to the diamond feed stock is between 5 and 20 wt. %.

19. A method as claimed in claim 1, wherein the proportion of the precursor binder mixture to the diamond feed stock is between 5 and 15 wt. %.

\* \* \* \* \*